Dec. 22, 1942.   E. EGER ET AL   2,305,853
APPARATUS FOR FORMING SHEET MATERIAL
Filed April 16, 1941
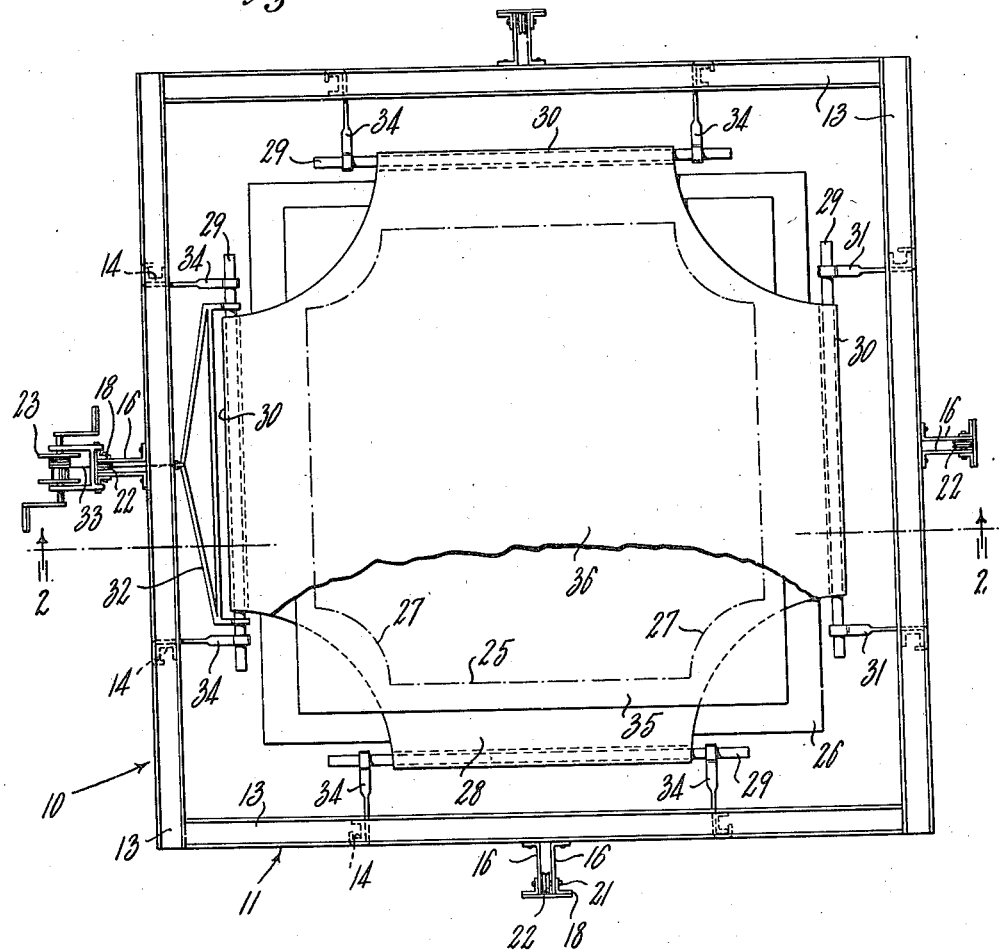
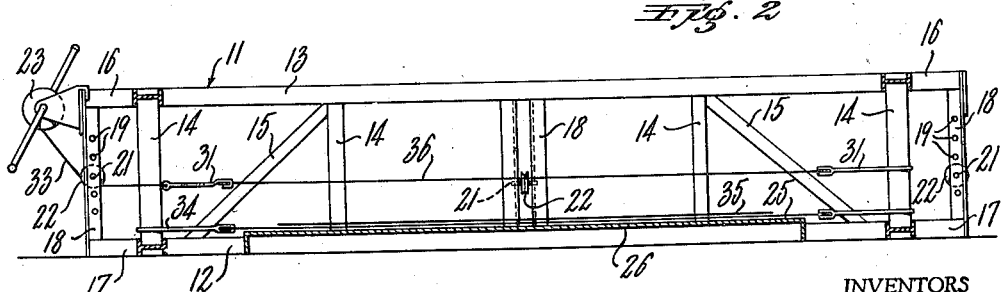
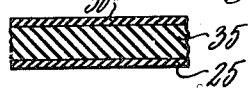
INVENTORS
ERNST EGER
HERBERT A. WRIGHT
BY Lester J. Bradley
ATTORNEY Patented Dec. 22, 1942

2,305,853

UNITED STATES PATENT OFFICE 2,305,853

APPARATUS FOR FORMING SHEET MATERIAL

Ernst Eger, Grosse Pointe Park, and Herbert A. Wright, Detroit, Mich., assignors to United States Rubber Company, New York, N. Y., a corporation of New Jersey Application April 16, 1941, Serial No. 388,780

3 Claims. (Cl. 154—1)

This invention relates to apparatus for forming flexible sheet material, and more particularly, to an apparatus for forming puncture sealing sheet material having a plurality of layers, one of which is held in a state of compression by reason of the contractive characteristics of the other layers adjacent thereto.

In accordance with the present invention, we provide an apparatus for holding a plurality of layers of flexible elastic material, preferably of rubber composition, in a stretched or extended condition while another layer of rubber composition, of differing characteristics, is located in a relaxed condition between adjacent pairs of stretched layers and permanently adhered to these stretched layers; with the result that when the stretched layers are released and allowed to contract the intermediate layer of rubber composition is compressed and thus inherent compression stresses are induced and maintained in this intermediate layer of rubber composition acting to seal any punctures which may occur therein. A puncture-sealing sheet material having contractive or puncture-sealing characteristics similar to those just described is disclosed in the co-pending application of Ernst Eger Serial No. 324,820, filed March 19, 1940.

In the manufacture of puncture-sealing sheet material similar to that described above we now employ a special method and apparatus. A substantially square layer of soft, elastic rubber composition, of a hardness of approximately 15 durometer, is formed and vulcanized as a sheet to constitute the intermediate layer of our puncture-sealing sheet material. A pair of substantially square layers of relatively thin, tough, elastic rubber composition, such as a rubber composition having a hardness of approximately 40 durometer, are also formed and vulcanized. After the surface of each thin, tough layer of this pair, and both surfaces of the intermediate soft layer, have been buffed, the thin, tough layers are prepared for the stripping operation by having segmental portions cut from their four corners, for reasons to be hereinafter described, and have loops formed in the intermediate marginal side portions. One of the thin layers is then stretched with the buffed side up by placing elongated bars through these looped portions and the bars are engaged by tensioning means secured to a specially prepared stretching frame. This layer of material is stretched to approximately one and a half times its original dimensions, the stretching taking place in two directions at right angles to each other, and the buffed upper surface of the layer is then coated with a self-vulcanizing cement. While this layer is held in a stretched condition the soft, intermediate layer is placed thereon and the exposed upper surface of this layer is similarly coated with the cement, after which the second thin layer is stretched or tensioned in an elevated position above the coated layers and is then lowered into contact with the prepared surface of the soft layer. The composite sheet material thus formed is weighted to hold the several layers thereof firmly in engagement with each other while a cold-vulcanization takes place therebetween to form integral joints between the soft rubber stock and the stretched sheet material.

The stretching frame and associated apparatus employed for forming the puncture-sealing sheet material comprises a pair of vertically spaced, preferably square, open frames interconnected by vertical members which are properly positioned in spaced relation along the sides of these frames so as to serve in conjunction with the specially prepared thin layers of rubber composition and the tensioning means of the apparatus to allow one of the tensioned layers to be moved vertically downwardly into contact with the other layers of the puncture sealing sheet material during the manufacture thereof.

The invention will be more fully understood from the following description when taken in conjunction with the accompanying drawing, in which:

Fig. 1 is a plan view of the apparatus employed for forming puncture-sealing flexible sheet material;

Fig. 2 is a vertical cross-sectional view of the apparatus of Fig. 1; and

Fig. 3 is a partial cross-sectional view of an illustrative form of puncture-sealing sheet material which may be formed by this apparatus.

Referring to the drawing in detail, and particularly to Figs. 1 and 2, the reference numeral 10 indicates generally an open substantially square stretching frame having vertically spaced upper and lower frame sections 11 and 12. Each of these frame sections comprises channel members 13 arranged in over-lapping relation at their adjacent ends and securely fastened together by suitable means, such as riveting or welding. A pair of suitably positioned vertical spacing members 14 is positioned between the upper and lower frame sections 11 and 12 and the members of this pair are also secured in position by welding their opposite ends to intermediate portions of the frame members 13. The rigid open rectangular frame formed by these members 13 and 14 can be further strengthened by suitable bracing members 15 if desired.

Secured to an intermediate or central portion of each frame member 13 is a pair of horizontally extending brackets 16 and 17 to which are secured vertically extending angle irons 18. These angle irons 18 may be maintained in horizontally spaced relation by any suitable means (not shown) and each may be provided with a series of openings 19 for adjustably receiving a set of retractable pins 21 upon which are rotatably mounted grooved rollers 22, the purpose of which will be hereinafter more fully described. Removably carried upon the upper ends of each pair of spaced angle irons 18 is a manually operable winch 23 of any conventional construction.

When the open rectangular stretching frame 10 just described is employed in the manufacture of puncture-sealing sheet material, a properly prepared sheet 25 of relatively high tensile strength elastic rubber composition is placed, as indicated by dot and dash lines in Fig. 1, upon a suitable work-supporting platen or platform 26. This prepared sheet 25 of stretchable rubber composition has first had its corners cut away as indicated at 27 to permit greater uniformity in the sheet material during the stretching operation, and has had its straight side edges folded back upon themselves to form an elongated loop 30 along each of the sides of the sheet material for the reception of a tensioning bar 29.

The prepared sheet of stretchable material may be stretched in two directions simultaneously or successively as desired. To accomplish such a stretching operation, a bar 29 is slipped through the loop 30 in a side of the sheet material 25, and then over the exposed ends of the bar 29 are placed hooks 31 which slidably engage the vertical members 14 previously described. A second bar 29 is positioned in the loop 30 of the opposite side of the sheet material and to this bar is detachably secured a yoke 32 to the central portion of which is secured an end of the flexible cable 33 wound upon the winch 23. Operation of the winch 23 will draw the sheet material into a position suitable for receiving hooks 34, similar to the hooks 31, which may be then placed around the vertical members 14 and hold the sheet material in a tensioned condition. After this one-way stretch has been placed on the sheet material, a similar operation may be performed for stretching the material at right angles to the first direction of stretch. After all of the retaining hooks 31 or 34 have been positioned upon the ends of the bars 29 and about the vertical members 14, the tensioned sheet 25 may be lowered upon the surface of the work support 26 by sliding these hooks downwardly relatively to the members 14. The members 14 thus form guides for conveying the stretched sheet toward the platen 26. The sheet material 25 in its stretched condition may have imparted thereto an elongation of as high as 40% or 50% of its original dimensions at which time it will have moved from the dot and dash lines of Fig. 1 to the full line position also shown by this figure.

As the exposed or upper face of this tension sheet of elastic material 25 has been previously buffed following its vulcanization, it is in a proper condition to have applied to its buffed upper surface an application of cementitious material having cold-vulcanizable properties. Upon the cement surface 28 of the sheet 25 is then positioned, as clearly shown in Fig. 2, a second or soft sheet or layer 35 of 15 durometer stock which has had its opposite surfaces similarly previously buffed following its vulcanization, and after the upper surface of this soft layer of rubber composition has been suitably prepared a second elastic layer 36, similar to the layer 25 is likewise tensioned in two directions in the stretching frame as indicated in Fig. 2, and as its lower surface has likewise been previously buffed following its vulcanization it may be lowered after the hooks 31 and 34 have been properly positioned to hold it in a tensioned state onto the cemented surface of the soft durometer layer 35.

When the two tensioned layers and the intermediate layer 35 have been pressed firmly into engagement with each other a relatively heavy flat plate (not shown) of a size corresponding to the size of the support 26 may be lowered onto the upper surface of this composite assembly formed by the sheets 25, 35 and 36 and allowed to remain in this position until a cold vulcanization of the three layers has taken place. In Fig. 3 is shown in section a portion of the puncture sealing sheet material produced by the stretching machine or apparatus of this invention. This sheet of elastic material comprises layers 25 and 36 of high tensile strength rubber composition permanently holding the soft rubber composition of the layer 35 in a state of compression. The tension in the layers 25 and 36 and the compression in the layer 35 balance each other to the extent that the completed assembled sheet of material lies flat when released from the tensioning apparatus and, for purposes of handling, functions substantially the same as a conventional sheet of rubber substantially strain-free internally.

The extent to which the layers 25 and 36 are stretched depends largely upon the amount of compression strains desired in the intermediate soft layer 35. However, for practical purposes, it has been found that a two-way stretch of about 50% in each direction produces a satisfactory compression layer intermediate these two outer surface layers. The tension imparted previously to the outer layers 25 and 36 is released or rather, the energy is transferred to the intermediate layer 35 in the form of compression strains which react with each other to produce a balanced sheet material. Due to the compression strains embodied in the intermediate layer 35, the thickness of this layer increases to a substantial extent.

The composite sheet material thus produced by the apparatus of this invention may be cut to any desired shape and fitted around any obstruction when it is being employed to form a puncture-sealing layer, such as a protective layer for gasoline tanks in airplanes, and may be easily made to conform to all of the various shapes of such objects. All of the seams or joints formed between different sheets of this compression puncture-sealing material are preferably joined together by a self-curing rubber cement.

In the operation of the compression layer as a sealing material or protective layer for gasoline tanks and the like, the compression layer acts as an emergency or safety means to prevent loss of liquid from within the tank by closing any opening or puncture occurring therein, such action supervening because of the inherent tendency of this compression layer to expand whenever such expansion is possible. For example, in the case of tanks filled with inflammable material, such as gasoline, it will be recognized that if the tank is punctured by a projectile or the like, the gasoline will not be permitted to pass through this puncture-sealing layer 35 and this layer will function effectively to prevent loss of the fluid from within.

From the foregoing description it will be readily apparent that we have produced a very simple but yet effective apparatus for forming relatively large flat sheets of puncture-sealing sheet material in an efficient and rapid manner. It will also be apparent that the apparatus of this invention may be employed for forming a plurality of puncture sealing sheets by positioning these layers successively upon the support 26 before the large flat weight (not shown) is positioned thereon.

Although the invention has been disclosed in connection with specific details of a preferred embodiment thereof, it will be readily understood that such details are not intended to be limitative of the invention except insofar as is set forth in the accompanying claims.

Having thus described our invention, what we claim and desire to protect by Letters Patent is:

1. In an apparatus for fabricating flexible puncture-sealing sheet material, the combination of an open structural frame having spaced upright posts secured rigidly to each side thereof, a plurality of sets of retaining means associated with said upright posts, each such set being adapted to engage edge portions of one of a series of elastic ruber composition sheets positioned within said frame, so as to hold the selected sheet in an extended position, and tensioning devices adapted to be associated selectively with any of said sets of retaining means and for moving the retaining means to a position in which said selected sheet is extended operatively, each of said sets of retaining means being movable along said upright posts to hold its sheet at a desired level independently of said tensioning devices.

2. Apparatus for assembling a stack of laminations under tension, comprising in combination a platten, means for holding a sheet under tension in mutually perpendicular directions adjacent the platten, means for holding a second sheet under tension in mutually perpendicular directions above the platten, and means for conveying the last named means toward the platten to move the corresponding sheet, while in tension, adjacent the first mentioned sheet.

3. Apparatus for assembling a stack of laminations under tension, comprising in combination a platten, means for holding a sheet under tension in mutually perpendicular directions adjacent the platten, means for stretching a second sheet in mutually perpendicular directions, means for holding the second sheet stretched above the platten, and guide means for the holding means adapted to convey the holding means toward the platten to move the second sheet, while held in tension, adjacent the first named sheet.

ERNST EGER.
HERBERT A. WRIGHT.